United States Patent
Ito

(10) Patent No.: US 7,730,860 B2
(45) Date of Patent: Jun. 8, 2010

(54) ACTUATOR CONTROL APPARATUS AND METHOD

(75) Inventor: Tokiji Ito, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 160 days.

(21) Appl. No.: 12/122,302

(22) Filed: May 16, 2008

(65) Prior Publication Data

US 2008/0283007 A1    Nov. 20, 2008

(30) Foreign Application Priority Data

May 16, 2007    (JP) .............................. 2007-130513

(51) Int. Cl.
*F01L 1/34*    (2006.01)
(52) U.S. Cl. ................. 123/90.16; 123/90.15
(58) Field of Classification Search .............. 123/90.11, 123/90.15, 90.16
See application file for complete search history.

(56) References Cited

U.S. PATENT DOCUMENTS 6,094,974 A * 8/2000 Yamagishi et al. ....... 73/114.79

7,343,887 B2   3/2008 Soejima

FOREIGN PATENT DOCUMENTS

| JP | 11-2141 | 1/1999 |
|---|---|---|
| JP | 11-44226 | 2/1999 |
| JP | 2000-282901 | 10/2000 |
| JP | 2001-254637 | 9/2001 |
| JP | 2005-147115 | 6/2005 |
| JP | 2006-37787 | 2/2006 |
| JP | 2006-70789 | 3/2006 |
| JP | 2006-523798 | 10/2006 |

* cited by examiner

*Primary Examiner*—Zelalem Eshete
(74) *Attorney, Agent, or Firm*—Oblon, Spivak, McClelland, Maier & Neustadt, L.L.P.

(57) ABSTRACT

An actuator control apparatus includes: an actuator that changes a state amount of an internal combustion engine; a sensor that detects an actual operation position of the actuator; a controller that controls the actuator to bring the actual operation position of the actuator to a target operation position set based on the operation state of the internal combustion engine; and a diagnosis portion that diagnoses the operation state of the actuator to be normal if the deviation between the target operation position and the actual operation position has been small for a predetermined time period and the amount by which the target operation position has changed in the predetermined time period is equal to or larger than a predetermined value. A method for controlling such an actuator control apparatus is also provided.

2 Claims, 4 Drawing Sheets

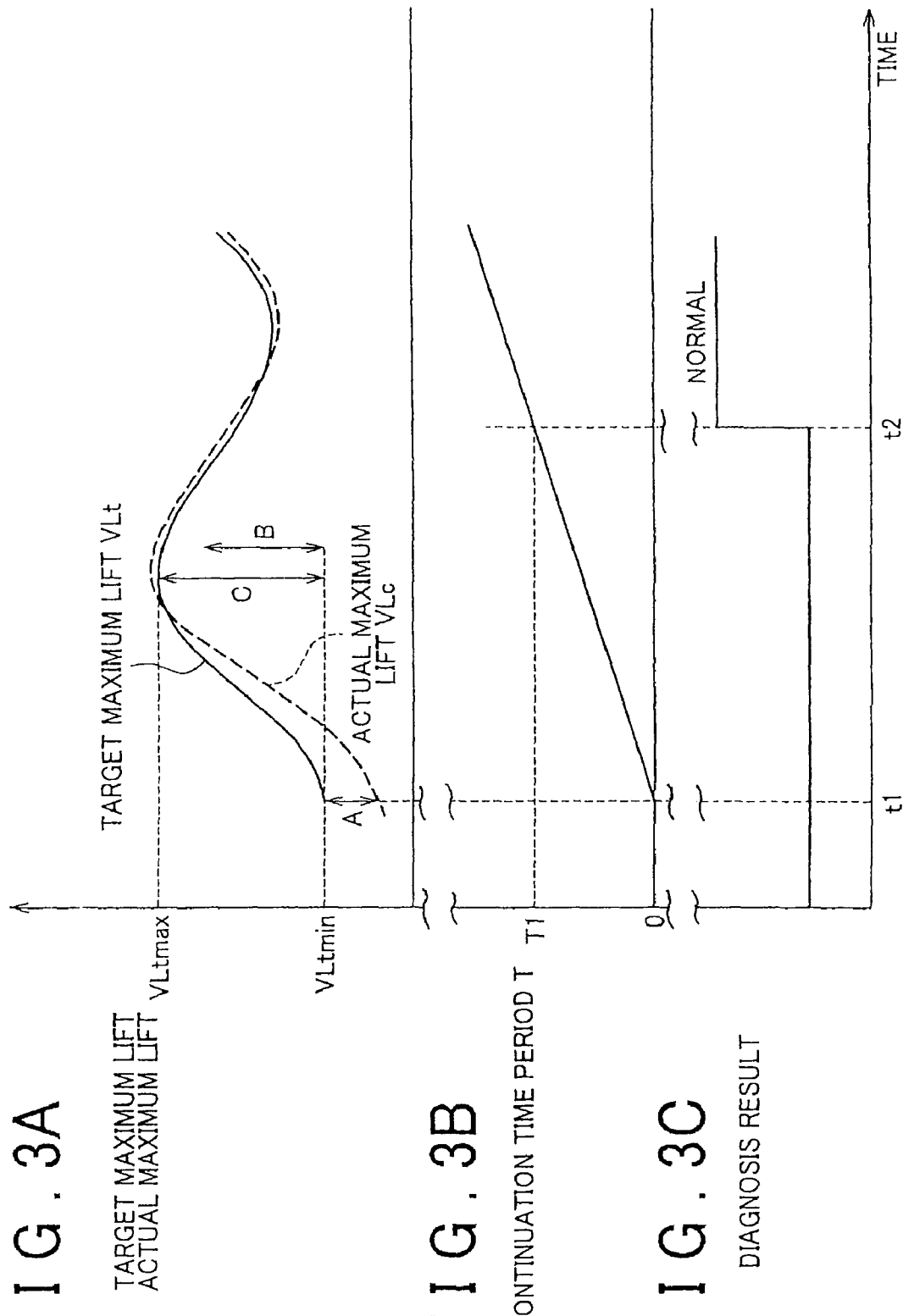

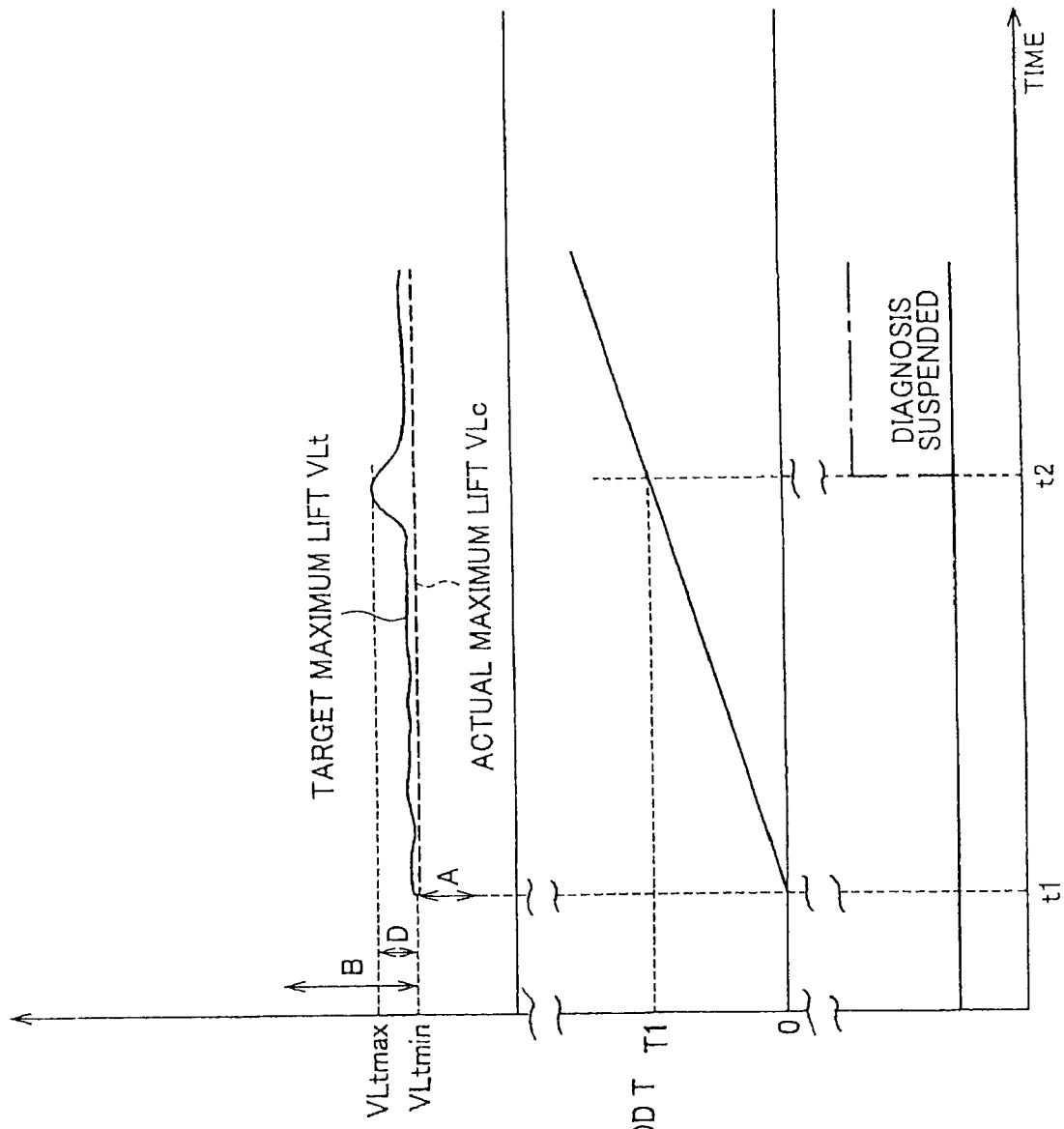

ACTUATOR CONTROL APPARATUS AND METHOD

INCORPORATION BY REFERENCE

The disclosure of Japanese Patent Application No. 2007-130513 filed on May 16, 2007, including the specification, drawings and abstract is incorporated herein by reference in its entirety.

BACKGROUND OF THE INVENTION

1. Field of the Invention

The invention relates to an actuator control apparatus that has an actuator for changing a state amount of an internal combustion engine and a sensor for detecting the actual operation position of the actuator and controls the actuator so as to bring the actual operation position of the actuator to a target operation position set based on the operation state of the internal combustion engine. The invention also relates to a method for controlling such an actuator.

2. Description of the Related Art

For example, Japanese Patent Application Publication No. 2006-37787 describes a variable valve mechanism control apparatus that sets the target operation position of the variable valve mechanism corresponding to the maximum target lift of the intake valves based on the engine operation state. This control apparatus detects the actual operation position of the variable valve mechanism using a sensor and determines the actual maximum lift of the intake valves based on the result of detection by the sensor. Then, the control apparatus controls the operation position of the variable valve mechanism such that the actual maximum lift equals the target maximum lift.

When the variable valve mechanism is placed in an abnormal state due to, for example, foreign matter being jammed at movable portions of the variable valve mechanism, degraded oil sticking to the movable portions, and so on, the maximum lift of the intake valves becomes unable to be properly changed in accordance with the operation state of the internal combustion engine.

Therefore, conventionally, whether the operation state of the variable valve mechanism is normal is diagnosed based on the deviation between the target maximum lift and the actual maximum lift of the intake valves, which deviation is obtained from the result of detection by the sensor. Typically, if the deviation between the target maximum lift and the actual maximum lift has continuously been equal to or lower than a predetermined value for a predetermined period or longer, the state of the variable valve mechanism is diagnosed to be normal, and if not, conversely, the state of the variable valve mechanism is diagnosed to abnormal.

Meanwhile, the actual target lift does not change largely in a state where the target maximum lift does not change largely, such as when the internal combustion engine is idling or when the internal combustion engine is running in a steady state. In such a case, the deviation between the actual maximum lift and the target maximum lift may remain equal to or smaller than the predetermined value even if the variable valve mechanism is in an abnormal state (e.g., the response of the variable valve mechanism is excessively low). In such a case, the aforementioned conventional control apparatus would erroneously determine that the variable valve mechanism presently has no abnormalities, that is, that the state of the variable valve mechanism is presently normal, which is a problem.

Although a variable valve mechanism for changing the maximum lift of the valves of an internal combustion engine, which is one of valve characteristics, has been described above, it is to be understood that problems identical or similar to the one described above may occur to various other actuator control apparatuses that change an engine state amount by controlling the actual operation position of an actuator to its target operation position set based on the engine operation state.

SUMMARY OF THE INVENTION

In view of the above, the invention has been made to provide an actuator control apparatus and method that enable more accurate diagnosis of the operation state of the actuator.

One aspect of the invention relates to an actuator control apparatus, having: an actuator that changes a state amount of an internal combustion engine; a sensor that detects an actual operation position of the actuator; a controller that controls the actuator so as to bring the actual operation position of the actuator to a target operation position set based on an operation state of the internal combustion engine; and a diagnosis portion that diagnoses an operation state of the actuator to be normal on the condition that the deviation between the target operation position and the actual operation position has been small for a predetermined time period and the amount by which the target operation position has changed in the predetermined time period is equal to or larger than a predetermined value.

Another aspect of the invention relates to a method for controlling an actuator control apparatus having an actuator operable to change a state amount of an internal combustion engine and a sensor for detecting an actual operation position of the actuator. This method includes: controlling the actuator so as to bring the actual operation position of the actuator to a target operation position set based on an operation state of the internal combustion engine; and diagnosing an operation state of the actuator to be normal on the condition that the deviation between the target operation position and the actual operation position has been small for a predetermined time period and the amount by which the target operation position has changed in the predetermined time period is equal to or larger than a predetermined value.

In the actuator control apparatus and method described above, the actuator may be adapted to change, as the state amount of the internal combustion engine, at least one of valve characteristics including the timing for opening an intake valve of the internal combustion engine, the timing for closing the intake valve, and the maximum lift of the intake valve, and the actuator may be a variable valve mechanism operable to change the maximum lift of the intake valve. Further, in the actuator control apparatus and method described above, the actuator may be adapted to change, as the state amount of the internal combustion engine, valve characteristics of an exhaust valve of the internal combustion engine, instead of or in addition to the valve characteristics of the intake valve. In this case, the actuator may be a variable valve mechanism operable to change the maximum lift of the exhaust valve.

According to the above-described actuator control apparatus and method, even in a case that the absolute deviation between the target operation position and the actual operation position of the actuator has been small for the predetermined time, the operation state of the actuator is not diagnosed to be normal if the absolute deviation between the maximum value and the minimum value of the target operation position of the actuator in the predetermined time period is smaller than the predetermined value. That is, the diagnosis of the operation state of the actuator is suspended, for example, in a state where the absolute deviation between the target operation position and the actual operation position of the actuator would remain small inevitably even if the response of the actuator is excessively low. As such, the operation state of the actuator can be accurately diagnosed.

The actuator may be a variable valve mechanism that changes the maximum lift of an intake valve.

For example, in a case where an internal combustion engine having a variable valve mechanism idles or runs in a steady state for a long period of time, the maximum lift of the intake valve is kept at a certain value, and therefore the target maximum lift is not changed for a long period of time. In such a case, even if the variable valve mechanism is in an abnormal state (e.g., the response of the variable valve mechanism is excessively low), the absolute deviation between the target maximum lift and the actual maximum lift may remain small for the predetermined time period or longer, and as a result, the operation state of the variable valve mechanism may be erroneously diagnosed to be normal based on the fact that the absolute deviation between the target maximum lift and the actual maximum lift has continuously been small.

According to the actuator control apparatus and method described above, however, the diagnosis of the operation state of the variable valve mechanism is suspended in a state where the target maximum lift is changed by only a small amount and therefore whether the operation state of the variable valve mechanism is normal can not be properly diagnosed. As such, the operation state of the variable valve mechanism can be accurately diagnosed.

Further, the actuator may be adapted to change the opening degree of a throttle valve of the internal combustion engine as the state amount of the internal combustion engine.

In this case, for example, the operation state of the motor for driving the throttle valve is diagnosed to be normal if the deviation between the target opening degree and the actual opening degree of the throttle valve has been small for a predetermined time period and the amount by which the target opening degree of the throttle valve has changed in the predetermined time period is equal to or larger than a predetermined value. As such, the operation state of the motor can be accurately diagnosed.

BRIEF DESCRIPTION OF THE DRAWINGS

The foregoing and further features and advantages of the invention will be better understood by reading the following detailed description of preferred embodiments of the invention, when considered in connection with the accompanying drawings, in which:

FIG. 3 has a timing chart (a) that illustrates the variations of the maximum target lift and the actual maximum lift of the intake valves, a timing chart (b) that illustrates the variation of the continuation time period T for which the deviation between the target maximum lift and the actual maximum lift remains smaller than a predetermined value, and a timing chart (c) that illustrates the variation of the result of the diagnosis of the operation state of the variable valve mechanism, respectively; and FIG. 4 has a timing chart (a) that illustrates the variations of the maximum target lift and the actual maximum lift of the intake valves, a timing chart (b) that illustrates the variation of the continuation time period T for which the deviation between the target maximum lift and the actual maximum lift remains smaller than the predetermined value, and a timing chart (c) that illustrates the variation of the result of the diagnosis of the operation state of the variable valve mechanism, respectively

DETAILED DESCRIPTION OF THE EMBODIMENTS

In the following description and the accompanying drawings, the invention will be described in greater detail with reference to an example embodiment. Hereinafter, an actuator control apparatus according to the example embodiment of the invention will be described with reference to FIG. 1 to FIG. 3. The actuator control apparatus of this example embodiment is a control apparatus for controlling a variable valve mechanism operable to change the maximum lift of the intake valves, which is one of state amounts of an internal combustion engine for vehicles.

Figure 1:
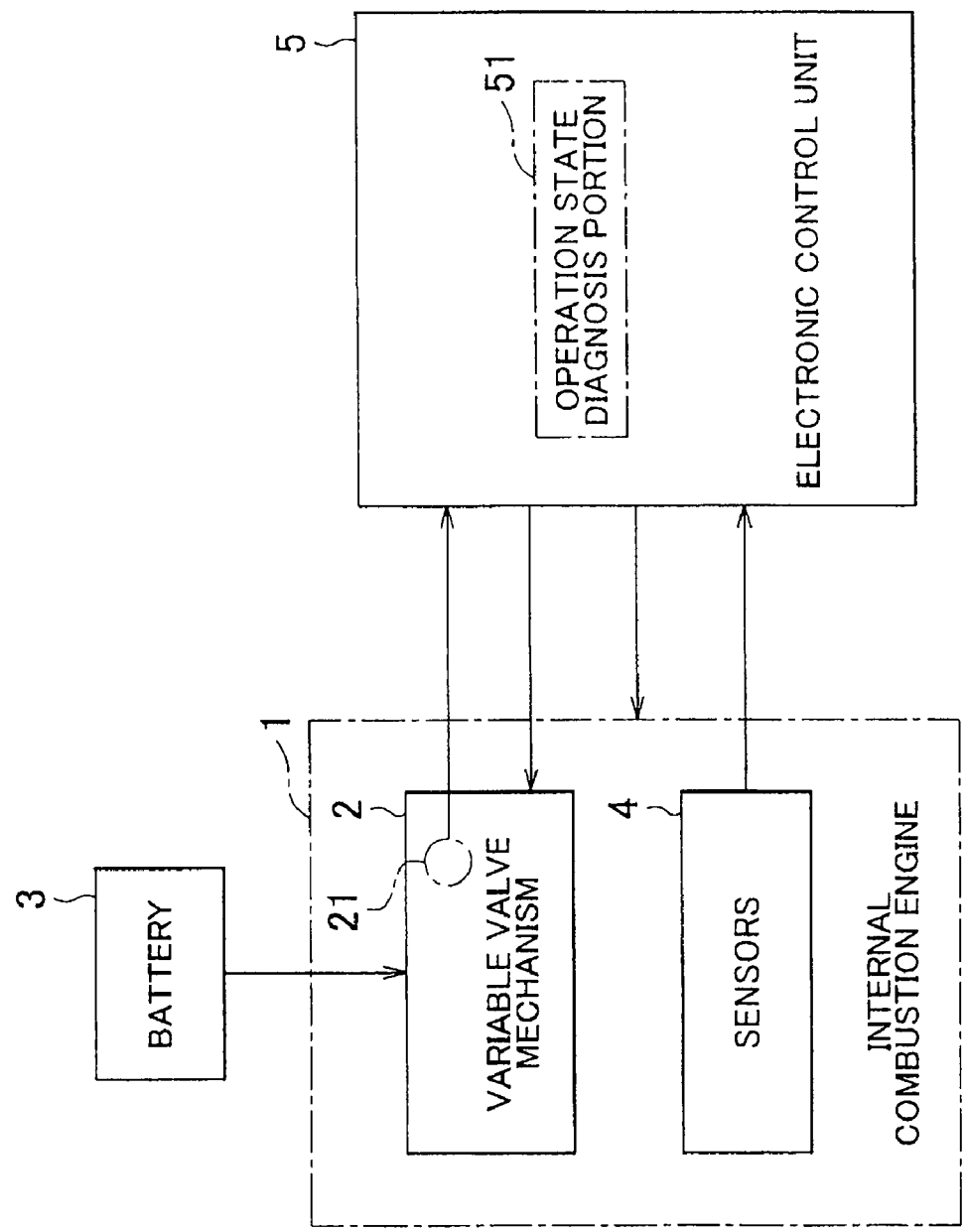
FIG. 1 is a block diagram schematically illustrating the relation between the variable valve mechanism control apparatus of an example embodiment of the invention and the variable valve mechanism controlled by said control apparatus.

The block diagram of FIG. 1 schematically illustrates the relation between the variable valve mechanism control apparatus of the example embodiment and the variable valve mechanism controlled by said control apparatus. Referring to FIG. 1, an internal combustion engine 1 is provided with the variable valve mechanism 2 operable to change the maximum lift of the intake valves as needed. The variable valve mechanism 2 is provided with a position sensor 21 for detecting the actual operation position of the variable valve mechanism 2. The result of detection by the position sensor 21 is provided to an electronic control unit 5, which will be described later. The operation position of the variable valve mechanism 2 is changed by a motor powered by a battery 3, whereby the maximum lift of the intake valves changes accordingly.

The internal combustion engine 1 incorporating the variable valve mechanism 2 is provided with various sensors 4 for detecting the state of the internal combustion engine 1, such as an accelerator sensor for detecting the travel of the accelerator pedal of the vehicle and a crank angle sensor for detecting the rotational phase of the crankshaft of the internal combustion engine 1. The results of detections by these sensors 4 are provided to the electronic control unit 5.

The electronic control unit 5 sets a target maximum lift VLt for the intake valves based on the operation state of the internal combustion engine 1 and detects the actual operation position of the variable valve mechanism 2, that is, an actual maximum lift VLc of the intake valves, based on the result of detection by the position sensor 21. Then, the electronic control unit 5 drives the variable valve mechanism 2 such that the actual maximum lift VLc equals the target maximum lift VLt. At this time, the electronic control unit 5 performs feed back control on the operation position of the variable valve mechanism 2.

Meanwhile, the maximum lift of the intake valves can not be properly controlled according to the operation state of the internal combustion engine 1 if the variable valve mechanism 2 is in an abnormal state due to, for example, foreign matter jammed at movable portions in the variable valve mechanism 2, degraded lubricant sticking to the movable portions being, and so on. Therefore, it is important to accurately diagnose whether the operation state of the variable valve mechanism 2 is normal.

Thus, an operation state diagnosis portion 51 of the electronic control unit 5 diagnoses the operation state of the variable valve mechanism 2 to be normal if the absolute deviation between the target maximum lift VLt and the actual maximum lift VLc has continuously been small for a predetermined time period T1 and the amount by which the target maximum lift VLt has changed in the predetermined time period T1 is equal to or larger than a predetermined value B.

Figure 2:
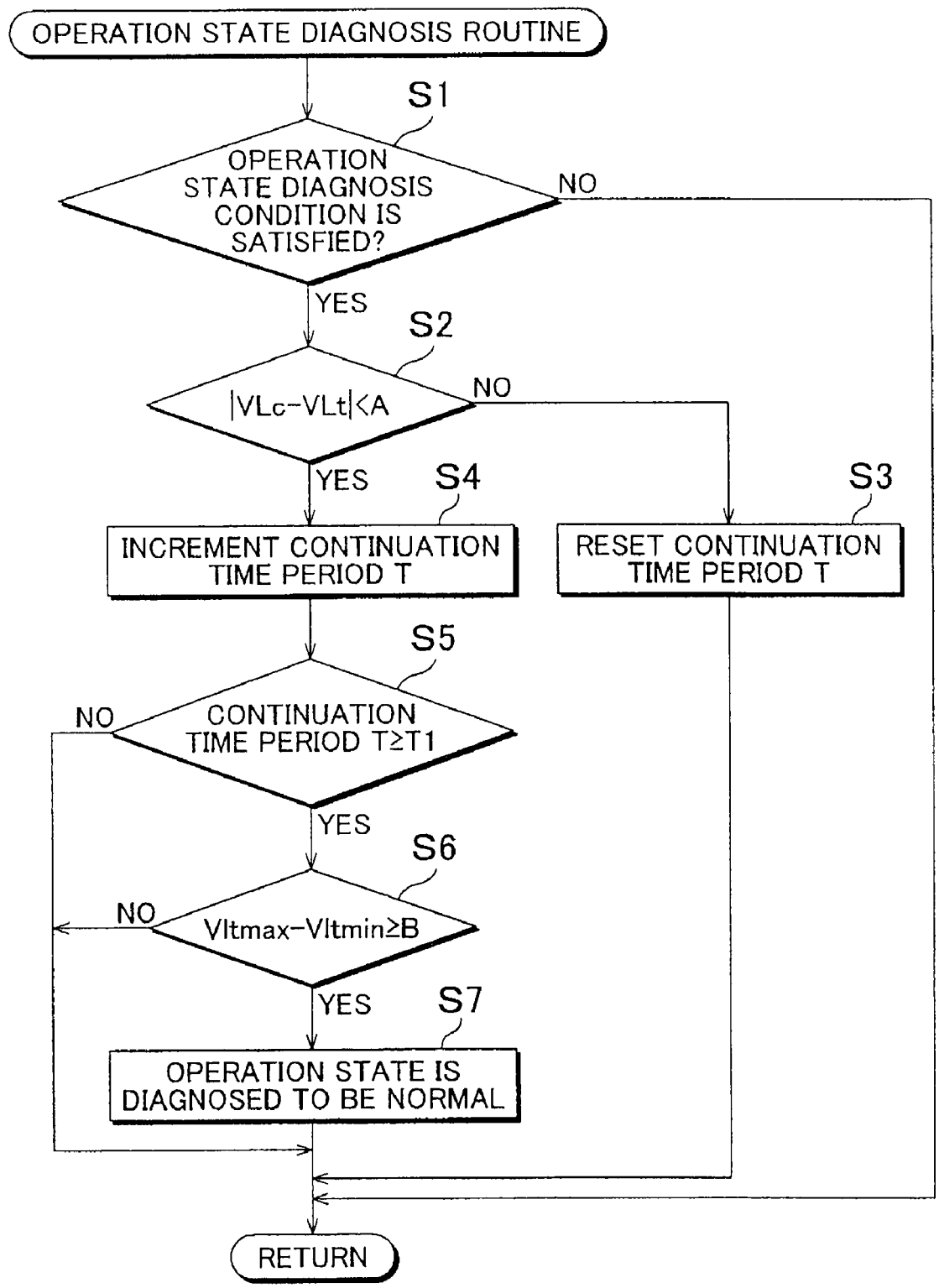
FIG. 2 is a flowchart illustrating a control routine that an electronic control unit of the variable valve mechanism control apparatus of the example embodiment executes to diagnose the operation state of the variable valve mechanism.

The flowchart of FIG. 2 illustrates a control routine that the electronic control unit 5 executes to diagnose the operation state of the variable valve mechanism 2 as described above. The electronic control unit 5 repeatedly executes this control routine at predetermined time intervals.

Referring to FIG. 2, after the start of the control routine, the electronic control unit 5 first determines whether a condition for diagnosing the operation state of the variable valve mechanism 2 (will be referred to as "operation state diagnosis condition") is presently satisfied (step S1). For example, the operation state diagnosis condition is regarded as being satisfied when the temperature of the engine coolant is −20° C. or higher, the engine speed is 300 rpm or higher, and the voltage of the battery 3 is 8V or higher.

That is, the operation state of the variable valve mechanism 2 can not be accurately diagnosed in a state where the response of the variable valve mechanism 2 is excessively low due to external factors, such as when the frictions at the movable portions of the variable valve mechanism 2 are high (e.g., when the temperature is extremely low or when the internal combustion engine 1 is still being started up) and when the power supplied to the variable valve mechanism 2 is insufficient. In this case, the electronic control unit 5 does not diagnose the operation state of the variable valve mechanism 2. As such, if the operation state diagnosis state is not presently satisfied (step S1: NO), the present cycle of the control routine is finished.

On the other hand, if the operation state diagnosis condition is presently satisfied (step S1: YES), the electronic control unit 5 then determines whether the absolute deviation between the target maximum lift VLt and the actual maximum lift VLc (=|VLt−VLc|) is presently smaller than a predetermined value A (step S2). At this time, if the absolute deviation is equal to or larger than the predetermined value A (step S2: NO), the electronic control unit 5 resets a continuation time period T to zero (step S3) and then finishes the present cycle of the control routine. The continuation time period T represents the time period for which the absolute deviation between the target maximum lift VLt and the actual maximum lift VLc continues to be smaller than the predetermined value A.

On the other hand, if the deviation between the target maximum lift VLt and the actual maximum lift VLc is smaller than the predetermined value A (step S2: YES), the electronic control unit 5 increments the continuation time period T (step S4). Then, the electronic control unit 5 determines whether the incremented continuation time period T is equal to or longer than the predetermined time period T1 (step S5). At this time, if the incremented continuation time period T is still shorter than the predetermined time period T1 (step S5: NO), the electronic control unit 5 finishes the present cycle of the control routine.

On the other hand, if the incremented continuation time period T is equal to or longer than the predetermined time period T1 (step S5: YES), the electronic control unit 5 then determines whether the deviation between a maximum value VLtmax and a minimum value VLtmin of the target maximum lift VLt (=VLtmax−VLtmin) is equal to or larger than a predetermined value B (B>A) (step S6). If said deviation is smaller than the predetermined value B (step S6: NO), the electronic control unit 5 finishes the present cycle of the control routine. That is, even in a case where the deviation between the target maximum lift VLt and the actual maximum lift VLc has continuously been small for the predetermined time period T1, whether the operation state of the variable valve mechanism 2 is normal can not be accurately diagnosed if the amount by which the target maximum lift VLt has changed in the predetermined time period T1 is small. In this case, therefore, the electronic control unit 5 does not diagnose the operation state of the variable valve mechanism 2 to be normal.

On the other hand, if the deviation between the maximum value VLtmax and the minimum value VLtmin of the target maximum lift VLt is equal to or larger than the predetermined value B (step S6: YES), the electronic control unit 5 diagnoses the operation state of the variable valve mechanism 2 to be normal (step S7) and then finishes the present cycle of the control routine. Hereinafter, a description will be made of, with reference to the timing charts of FIG. 3 and FIG. 4, how the maximum target lift VLt and the actual maximum lift VLc of the intake valves, the continuation time period T, and the result of the diagnosis of the operation state of the variable valve mechanism 2 change as the control routine of FIG. 2 progresses.

In the example illustrated in FIG. 3, the continuation time period T starts to be counted as indicated in FIG. 3(b) in response to the deviation between the target maximum lift VLt and the actual maximum lift VLc (=|VLt−VLc|) becoming smaller than the predetermined value A at time t1. Then, when the continuation time period T reaches the predetermined time period T1 at time t2, the operation state of the variable valve mechanism 2 is diagnosed to be normal as indicated in FIG. 3(c) based on the fact that the deviation C between the maximum value VLtmax and the minimum value VLtmin of the target maximum lift VLt (=VLtmax−VLtmin) in the predetermined time period T1 (from time t1 to time t2) is larger than the predetermined value B.

On the other hand, in the example illustrated in FIG. 4A to FIG. 4C, the continuation time period T starts to be counted as indicated in FIG. 4B in response to the deviation between the target maximum lift VLt and the actual maximum lift VLc (=|VLt−VLc|) becoming smaller than the predetermined value A at time t1. Then, the continuation time period T reaches the predetermined time period T1 at time t2, However, at this time, the operation state of the variable valve mechanism 2 is not diagnosed to be normal, more specifically, the diagnosis of the operation state of the variable valve mechanism 2 is suspended as indicated in FIG. 4C because the deviation D between the maximum value VLtmax and the minimum value VLtmin of the target maximum lift VLt (=VLtmax−VLtmin) in the predetermined time period T1 (from time t1 to time t2) is smaller than the predetermined value B.

Thus, the variable valve mechanism control apparatus of the example embodiment of the invention provides the following advantages. In a case where the internal combustion engine 1 idles or runs in a steady state for a long period of time, the maximum lift of the intake valves is kept at a certain value, and therefore the target maximum lift VLt is not changed for a long period of time. In such a case, even if the variable valve mechanism 2 is in an abnormal state (e.g., the response of the variable valve mechanism 2 is excessively low), the absolute deviation between the target maximum lift VLt and the actual maximum lift VLc may remain small for the predetermined time period T1, and as a result, the operation state of the variable valve mechanism 2 may be erroneously diagnosed to be normal based on the fact that the absolute deviation between the target maximum lift VLt and the actual maximum lift VLc (=|VLt−VLc|) has continuously been small. In view of this, in the above-described example embodiment, the operation state diagnosis portion 51 is adapted to diagnose the operation state of the variable valve mechanism 2 to be normal on the condition that the absolute deviation between the target maximum lift VLt and the actual maximum lift VLc has been small for the predetermined time period T1 and the amount by which the target maximum lift VLt has changed in the predetermined time period T1 is equal to or larger than a predetermined value. According to this diagnosis, even in a case where the absolute deviation between the target maximum lift VLt and the actual maximum lift VLc has continuously been small for the predetermined time period T1, the operation state of the variable valve mechanism 2 is not diagnosed to be normal if the deviation between the maximum value VLtmax and the minimum value VLtmin (=VLtmax−VLtmin) in the predetermined time period T1 is smaller than the predetermined value B. That is, even if the response of the variable valve mechanism 2 is excessively low, the absolute deviation between the target maximum lift VLt and the actual maximum lift VLc may remain small inevitably in a state where the target maximum lift VLt changes by only a small amount. In such a case, therefore, the diagnosis of the operation state of the variable valve mechanism 2 is suspended. As such, the operation state of the variable valve mechanism 2 can be accurately diagnosed.

It is to be noted that the invention is not limited to the constructions and arrangements employed in the foregoing example embodiment. On the contrary, the invention may be embodied as various other actuator control apparatuses, such as those described below.

While the invention has been embodied as a control apparatus for controlling an electrically-driven variable valve mechanism in the foregoing example embodiment, the invention may alternatively be embodied as a control apparatus for controlling a hydraulically-driven variable valve mechanism. Further, while the variable valve mechanism in the foregoing example embodiment changes the maximum lift of the intake valves, the invention may be embodied as a control apparatus for controlling an actuator that changes, as engine state amounts, various other valve characteristics including the valve-opening timing, the valve-closing timing, the valve-opening-closing timing, and various combinations among them, as well as or instead of the maximum valve lifts. Further, the invention may be embodied as a control apparatus for controlling an actuator that changes the valve characteristics of the exhaust valves as well as or instead of the valve characteristics of the intake valves.

Further, the invention may be embodied as a motor control apparatus that changes the opening degree of a throttle valve as an engine state amount. In this case, for example, the operation state of the motor for driving the throttle valve is diagnosed to be normal if the deviation between the target opening degree and the actual opening degree of the throttle valve has been small for a predetermined time period and the amount by which the target opening degree of the throttle valve has changed in the predetermined time period is equal to or larger than a predetermined value.

While the invention has been described with reference to example embodiments thereof, it is to be understood that the invention is not limited to the described embodiments or constructions. To the contrary, the invention is intended to cover various modifications and equivalent arrangements. In addition, while the various elements of the example embodiments are shown in various combinations and configurations, other combinations and configurations, including more, less or only a single element, are also within the spirit and scope of the invention.

What is claimed is:

1. An actuator control apparatus, comprising:
   an actuator that changes a state amount of an internal combustion engine;
   a sensor that detects an actual operation position of the actuator;
   a controller that controls the actuator so as to bring the actual operation position of the actuator to a target operation position set based on an operation state of the internal combustion engine; and
   a diagnosis portion that diagnoses the operation state of the actuator to be normal on the condition that the deviation between the target operation position, which is set based on the operation state of the internal combustion engine, and the actual operation position has been small for a predetermined time period and the amount by which the target operation position has changed in the predetermined time period is equal to or larger than a predetermined value.

2. The actuator control apparatus according to claim 1, wherein the actuator is a variable valve mechanism that changes the maximum lift of an intake valve.

* * * * *